March 26, 1940.  A. E. STANLEY  2,195,193
MACHINE FOR TREATING FRUIT
Filed Feb. 28, 1939  4 Sheets-Sheet 1

INVENTOR
ALBERT E. STANLEY
BY
Edgar H. Kent
ATTORNEY

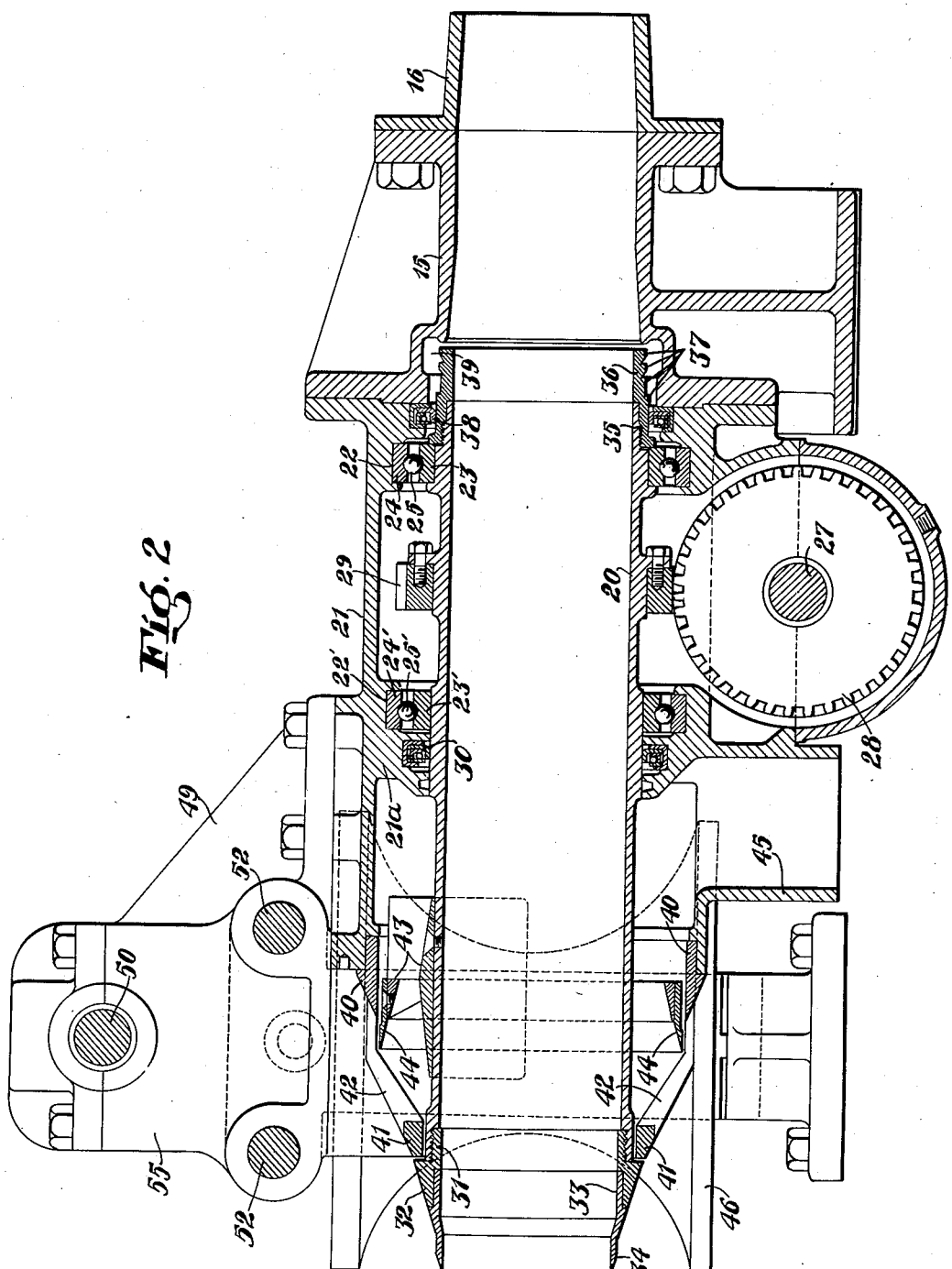

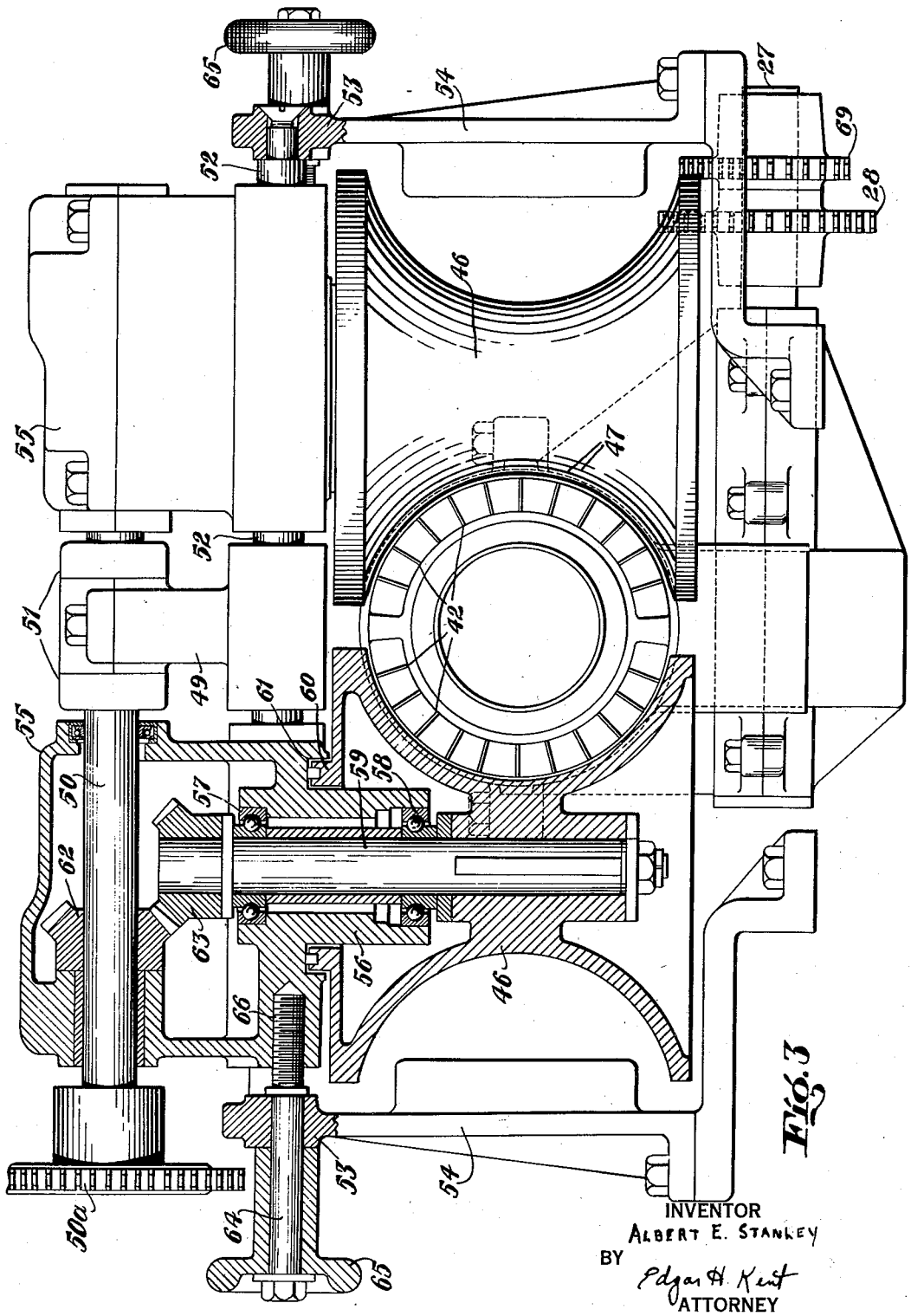

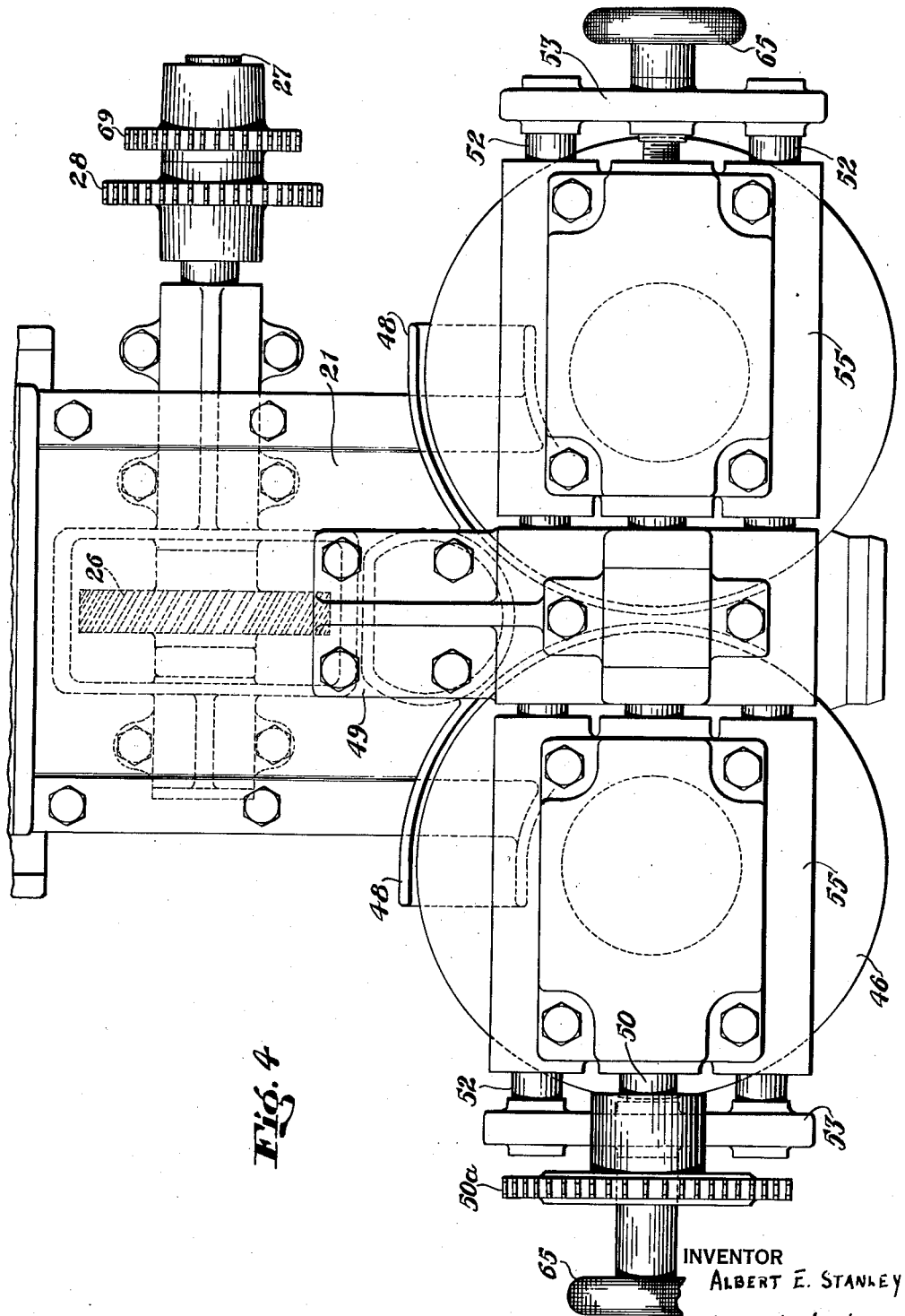

Patented Mar. 26, 1940

2,195,193

UNITED STATES PATENT OFFICE 2,195,193

MACHINE FOR TREATING FRUIT

Albert Ernest Stanley, Honolulu, Territory of Hawaii, assignor to Hawaiian Pineapple Company, Limited, Honolulu, Territory of Hawaii, a corporation of Hawaii Application February 28, 1939, Serial No. 258,959

7 Claims. (Cl. 146—6)

The present invention relates to certain new and useful improvements in machines for treating fruit, more particularly fruit of the pineapple class, in preparation for canning.

In my Patent No. 1,430,124 there is disclosed a machine for treating fruit preparatory to canning, said machine having a rotating tubular sizing head through which the fruit is fed to remove a central cylinder of the fruit of suitable diameter which is then passed to a trimming and coring machine, and combined with the sizing head, eradicator mechanism acting to remove the good meat left in the shells by the sizing head, said eradicator mechanism comprising generally a grid disposed concentrically around the sizing head, a knife rotating with the sizing head inside the grid and a pair of conical rollers disposed at opposite sides of the sizing head acting to feed the shells over the grid and to press their meat faces into contact with the grid to bring the good meat into the path of the removal knife.

In operating such machine it is necessary to make frequent adjustment in the position of said conical rolls toward or away from each other in order to obtain proper feeding pressure on the shells to assure removal of the desired amount of adherent meat. In the machine of my aforesaid patent, such adjustment is a difficult and time-consuming operation, necessitating stoppage of the machine, and requiring separate adjustment of top and bottom supporting connections with consequent danger of disaligning parts and disrupting operating connections. Further difficulty has been experienced with said machine because of juice working from the inner surface of the sizing head over the rear end and back along the outer surface into the housing, with consequent damage to the operating mechanism.

It is an object of the present invention to provide a machine similar in general construction and operation to that of my aforesaid patent, but in which the aforesaid and other difficulties experienced with said patented machine are obviated by the provision of novel mounting and operating connections for the shell feed rolls enabling ready adjustment of the rolls without stopping the machine and without danger of disaligning operating connections, by the addition of novel means to prevent seepage of fruit juice into the sizing head housing, and by other improvements that will be readily apparent from the ensuing more particular description and from the accompanying drawings, in which:

Fig. 2 is a vertical longitudinal section through the sizing head and eradicator;

Fig. 3 is a front elevation of the eradicator with parts at the left hand side broken away, illustrating particularly the mounting, driving and adjustment connections for the shell feed rolls;

Fig. 4 is a top plan view of the sizing head and eradicator.

Figure 1:
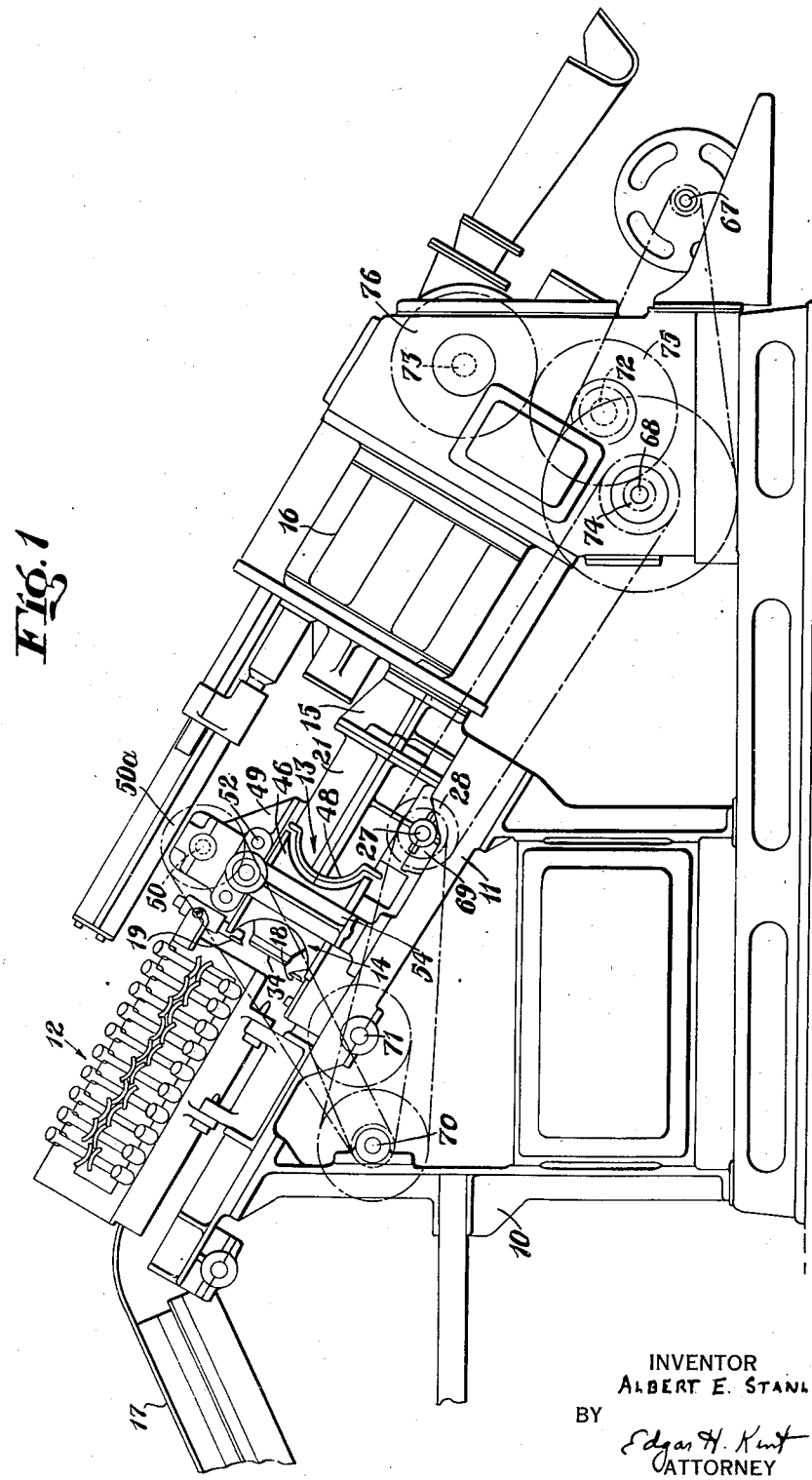
Fig. 1 is a side elevation of a machine of the invention in which the sizing head and eradicator are associated with fruit feeding and centering mechanism and with trimming and coring apparatus, part of the feeding mechanism being omitted and driving connections being illustrated more or less diagrammatically.

Referring to the embodiment illustrated in the accompanying drawings and first to Fig. 1, 10 designates the main frame having an inclined portion 11 upon which are supported in axial alignment a fruit centering device 12 at the top of the inclined portion 11, a sizing head 13 having its forward end adjacent the lower end of the centering device, eradicator mechanism 14 surrounding the sizing head adjacent its forward end, and, at the lower end of the sizing head, a casing 15 forming an entrance spout to a trimming and coring machine 16, likewise supported on said inclined frame portion 11. Pineapples are carried up an inclined chute 17 through the centering device to the sizing head by a conveyor (not shown) which maintains feeding engagement with each pineapple until the sizing knife has passed through it, and may be the chain provided with pivoted dogs shown and described in my Patent No. 1,430,124. As in the machine of said patent, the centering device 12 is of the same general type as that disclosed in Ginaca Patent No. 1,060,243, the trimming and coring apparatus 16 is of the same general type as that illustrated in Ginaca Patent No. 1,112,130, (although in the present machine the trimming and coring apparatus is tilted into alignment with the sizing head making the machine as a whole somewhat more compact than that shown in my aforesaid patent), and knives 18 and 19 are provided adjacent the forward end of the sizing head to slit the shells lengthwise before they pass into the eradicator.

Referring now to the construction of the sizing head and eradicator with which the present invention is more particularly concerned, as best shown in Fig. 2, sizing head 13 comprises a cylindrical tube 20 rotatably mounted within a housing 21 by means of bearings 22 and 22' comprising raceways 23 and 23' secured around the outer surface of the tube 20, raceways 24 and 24' set in the housing 21, and interposed balls 25 and 25'. Housing 21 is secured at its rear end to the casing 15. Tube 20 is rotated by means of a worm wheel 26 (see Fig. 4) on a shaft 27 mounted in the housing beneath the tube 20 and driven by means of a sprocket wheel 28, said worm wheel acting upon a worm gear 29 secured around the outer surface of the tube 20 between the bearings 22 and 22'. A sealing ring 30, seated in a central annular ridge 21a in the housing between the bearing 22' and forward end of the sizing head, and bearing on the outer surface of the tube 20, prevents fruit juice on the outer surface of the forward end of the tube from flowing into the bearing 22'.

Secured to the forward end of the tube 20 by a sleeve 31 having screw threaded engagement therewith is an annular nipple 32 having a general frusto-conical outer surface and having secured at its forward end, by sleeve 33, annular sizing knife 34. Knife 34, nipple 32 and tube 20 form a continuous passage through which the fruit cylinders cut by the knife 34 pass to the casing 15 which forms the entrance spout to the trimming and coring apparatus 16.

The sizing apparatus thus far described is generally similar to that shown and described in my Patent No. 1,430,124. With the machine of said patent it was found that juice from the cut pineapple cylinders passing through the rotary tubular member of the sizing head would flow in large quantities around the rear end of said member and back along its outer surface into and through the rear bearing with consequent damage to said bearing and other operating parts. This flow of juice is so substantial that it could not be adequately blocked by the addition of a sealing ring between said tubular member and the casing at the rear of said bearing. I have discovered that this deleterious flow of fruit juice can be substantially eliminated by providing on the outer surface of the rear end of said tubular member a series of narrow annular ridges. I have found that under the influence of the rotation of the tubular member these ridges act to expel the juice which flows back to them and because of this action I shall term the ridges herein as "juice throwing rings".

In Fig. 2 of the accompanying drawings there is shown attached externally to the rear of the cylindrical tube 20, by a threaded sleeve 35, a cylindrical tubular member 36 of corresponding inner diameter provided on its outer surface with a series of juice throwing rings 37 formed by suitably notching the outer surface of said member. Preferably, these rings are formed with steep rear faces as shown. A sealing ring 38 seated in the housing 21 and bearing on the tubular member 36 between the bearing 22 and the rings 37 serves to block any juice that may succeed in flowing back over the rings. The casing 15 adjacent said rings is hollowed to form a trough 39 in which the juice thrown by the rings is collected and from which it may be drained through a suitable opening (not shown).

Removably secured to the open forward end of the housing 21 is a grid member comprising a rear annular ring 40 attached to the inner surface of the housing, a forward annular ring 41 of smaller diameter, adapted to fit over the tube 20 immediately rearward of the nipple 32 and having a corner of its outer surface shaped to form a continuation of the slope of the outer surface of said nipple, and a plurality of narrow bars 42 secured to and connecting said rings and spaced at small regular intervals peripherally thereof (see Figs. 2 and 3). Secured to the outer surface of the tube 20, as by spacing thimbles 43, is an annular knife 44 having its cutting edge adjacent the inner surface of the rearward ends of the grid bars 42. Said knife 44 acts to cut so much of the meat from the inner surface of the shells pressed against the outer surface of the grid bars 42 as protrudes inwardly beyond said bars. A spout 45 is provided in the housing 21 rearwardly of said grid member from which the meat cut from the shells by the knife 44 may be discharged into any suitable receptacle.

As best shown in Fig. 3, there is provided at each side of the grid member a vertically disposed feed roll 46 having a concave face shaped to the contour of the grid member over which it fits in close proximity and provided with flutings 47 or other gripping surface. Said rolls 46 are rotated in opposite directions to feed the two parts of each shell slit by the knives 18 and 19 and removed from the pineapples by the sizing knife 34, over the grid member with their meat faces pressed against the grid and thence outwardly of the machine into suitable receptacles under the guidance of the two oppositely disposed outwardly and rearwardly flaring wing members 48 secured at the sides of the housing 21 at the rear of said feed rolls (see Figs. 1 and 4). It is important that these feed rolls be readily adjustable toward and away from each other and the grid member as such adjustment is frequently necessary to attain the desired amount of feeding pressure on the shells. In the machine of the present invention I provide such desired adjustability by means of the novel roll supporting and operating mechanism best shown in Figs. 3 and 4 and now to be described.

To the upper surface of the housing 21 is secured a bracket 49 projecting forwardly of the housing over the grid member. Rotatably journaled in the upper forward end of said bracket and extending transversely therethrough is a shaft 50 provided at one end with a sprocket wheel 50a. Shaft collars 51 are provided at each side of the bracket 49 to maintain said shaft in axial alignment. Secured in the lower forward end of the bracket 49 and extending transversely therethrough are two fixed parallel guide rods 52 supported centrally by said bracket and at their ends by cross yokes 53 secured to vertical brackets 54 attached to the main frame. On said guide rods 52 at each side of the bracket 49 there is slidably mounted a feed roll supporting drive housing 55.

As shown in the left hand part of Fig. 3, each housing 55 above the guide rods 52 provides an enclosed chamber through which the shaft 50 extends, said shaft being journaled in the end walls of the housings to permit rotation of the shaft and longitudinal sliding of the housings thereon. In the lower part of each of said housings 55 there is formed a vertical open ended sleeve 56 in which is rotatably mounted, as by ball bearings 57 and 58, a vertical shaft 59 to the lower end of which is secured one of the feed rolls 46, said shafts 59 being the sole supporting means for the rolls 46. As shown in Fig. 3, the upper end of each feed roll 46 is provided with an annular opening to receive the sleeve 56 and shaft 59 therethrough and said opening may be provided with an upwardly extending flange 60 rotatably received in a corresponding groove 61 in the lower surface of each housing 55. Each shaft 59 and attached feed roll 46 is rotated from the shaft 50 by means of a bevel gear 62 slidably keyed on shaft 50 and meshing bevel gear 63 secured to the upper end of the shaft 59, said gears being enclosed within the housings 55.

As will be apparent from the foregoing, the desired lateral adjustment of the feed rolls 46 may be effected merely by sliding the housings 55 toward or away from each other along the guide rods 52 and shaft 50 without interrupting or changing alignment of operating connections to the feed rolls and without any necessity of stopping the machine. To facilitate such adjustment, I provide through each of the cross yokes 53, between the guide rods 52, a shaft 64 rotatable in said yoke, having a hand wheel 65 secured to its outer end and having a threaded inner end received in a threaded aperture 66 in the corresponding housing 55.

In addition to the ready adjustability which it provides, the novel feed roll supporting and operating mechanism of the present invention has the further advantage that all its operating parts are effectively shielded against contamination, or accidental contact by operators, without in any wise interfering with adjustability.

As shown in Fig. 1, the various elements of the machine of the present invention may be operated from a single drive shaft 67 having a sprocket wheel and chain connection with a shaft 68 adjacent the rear end of the coring and trimming apparatus 16. Shaft 68 is connected by means of a sprocket wheel and chain to sprocket wheel 28 on shaft 27 which operates the tube 20 of the sizing head. Shaft 27 carries an additional sprocket wheel 69 connected by sprocket chain to a sprocket wheel on a shaft 70 secured to the forward part of the frame 10. Said shaft 70 in turn has sprocket wheel and chain connection with the sprocket wheel 50a on the shaft 50 which operates the feed rolls 46, and with another shaft 71 secured to the inclined portion 11 of the frame 10 and having driving connection with the pineapple conveyor (not shown). Shafts 72 and 73 which operate the coring and trimming apparatus 16 are driven from the shaft 68 by means of a gear 74 on said shaft meshing with a gear 75 on the shaft 72 which in turn meshes with a gear 76 on the shaft 73.

I claim:

1. In a machine for trimming meat from fruit shells, an annular grid, a rotary knife within the grid, a roller adapted to feed shells over the grid while pressing the meat face of the shells through the grid into the path of the rotary knife, and means for adjusting the roller to different fixed positions transversely of the axis of the grid while in shell feeding operation.

2. In a machine for trimming meat from fruit shells, an annular grid, a concave roller at one side of the grid having its axis normal to the axis of the grid and adapted to feed shells over the grid while pressing their meat faces through the grid into the path of the rotary knife, and means for shifting the roller at right angles to the axis of the grid while in shell feeding operation.

3. In a machine for trimming meat from fruit shells, an annular grid, a rotary knife within the grid, a roller adapted to feed shells over the grid while pressing the meat face of the shells through the grid into the path of the rotary knife, a standard adjacent an end of the roller, a hanger slidable on the standard and rotatably suspending the roller therefrom, means for sliding the hanger on the standard transversely of the axis of the grid to adjust the distance between the roller face and the grid and a drive connection to said roller slidable with said hanger.

4. In a machine for trimming meat from fruit shells, an annular grid, a rotary knife within the grid, a roller adapted to feed shells over the grid while pressing the meat face of the shells through the grid into the path of the rotary knife, a driven shaft adjacent an end of the roller having its axis transverse to the axis of the grid, a standard adjacent said end of the roller, a hanger slidable on the standard and rotatably supporting the roller thereon, means for sliding the hanger on the standard parallel to the axis of the driven shaft to adjust the distance between the roller face and the grid and a drive connection from the driven shaft to the roller slidable on the shaft.

5. In a machine for trimming meat from fruit shells, an annular grid, a rotary knife within the grid, a roller adapted to feed shells over the grid while pressing the meat face of the shells through the grid into the path of the rotary knife, a driven shaft adjacent an end of the roller having its axis transverse to the axis of the grid, a drive connection from the shaft to the roller slidable on the shaft, a housing for said drive connection slidable on the shaft and rotatably supporting the roller, and means for adjusting the position of said housing along said shaft whereby to vary the distance between the roller face and the grid.

6. In a machine for trimming meat from fruit shells, an annular grid, a rotary knife within the grid, a roller adapted to feed shells over the grid while pressing the meat face of the shells through the grid into the path of the rotary knife, a driven shaft adjacent an end of the roller having its axis transverse to the axis of the grid, a drive connection from the shaft to the roller slidable on the shaft, a housing for said drive connection slidable on the shaft and rotatably supporting the roller and a standard slidably mounting said housing for adjustment along said shaft whereby to vary the distance between the roller face and the grid.

7. In a machine for trimming meat from fruit shells, an annular grid, a rotary knife within the grid, a driven shaft extending transversely over the grid, a standard adjacent the shaft, a pair of casings slidable on the shaft and standard longitudinally of the shaft, a pair of feed rollers suspended endwise from the casings at opposite sides of the grid and shiftable with said casings, and drive connections from the shaft to the rollers housed within said casings and slidable on the shaft.

ALBERT ERNEST STANLEY.